(12) United States Patent
Chen et al.

(10) Patent No.: US 12,360,721 B2
(45) Date of Patent: Jul. 15, 2025

(54) DISPLAY INTERFACE CONTROL METHOD AND APPARATUS THEREOF, AND STORAGE MEDIUM

(71) Applicant: Lenovo (Beijing) Limited, Beijing (CN)

(72) Inventors: Xue Chen, Beijing (CN); Ke Wang, Beijing (CN); Yakun You, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/457,944

(22) Filed: Aug. 29, 2023

(65) Prior Publication Data
US 2024/0111471 A1    Apr. 4, 2024

(30) Foreign Application Priority Data
Sep. 30, 2022    (CN) .......................... 202211231785.4

(51) Int. Cl.
*G06F 3/14*    (2006.01)

(52) U.S. Cl.
CPC .................................. *G06F 3/1423* (2013.01)

(58) Field of Classification Search
CPC ...................................................... G06F 3/1423
See application file for complete search history.

(56) References Cited

U.S. PATENT DOCUMENTS

2012/0272179 A1*    10/2012   Stafford ................ G06F 3/0482
                                                            345/157

* cited by examiner

*Primary Examiner* — Robin J Mishler
(74) *Attorney, Agent, or Firm* — ANOVA LAW GROUP, PLLC

(57) ABSTRACT

A display interface control method, a display interface control apparatus and a storage medium are provided in the present disclosure. The display interface control method includes determining a display parameter of a first window in a second display screen based on a first operation of the first window in a first display screen; and displaying the first window in the second display screen based on the display parameter of the first window in the second display screen.

20 Claims, 10 Drawing Sheets

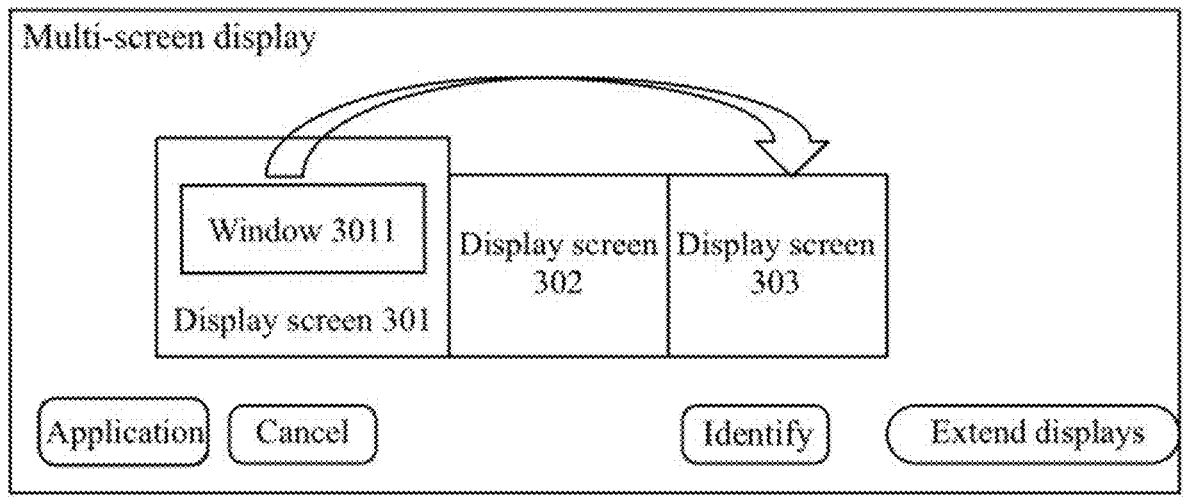
FIG. 3
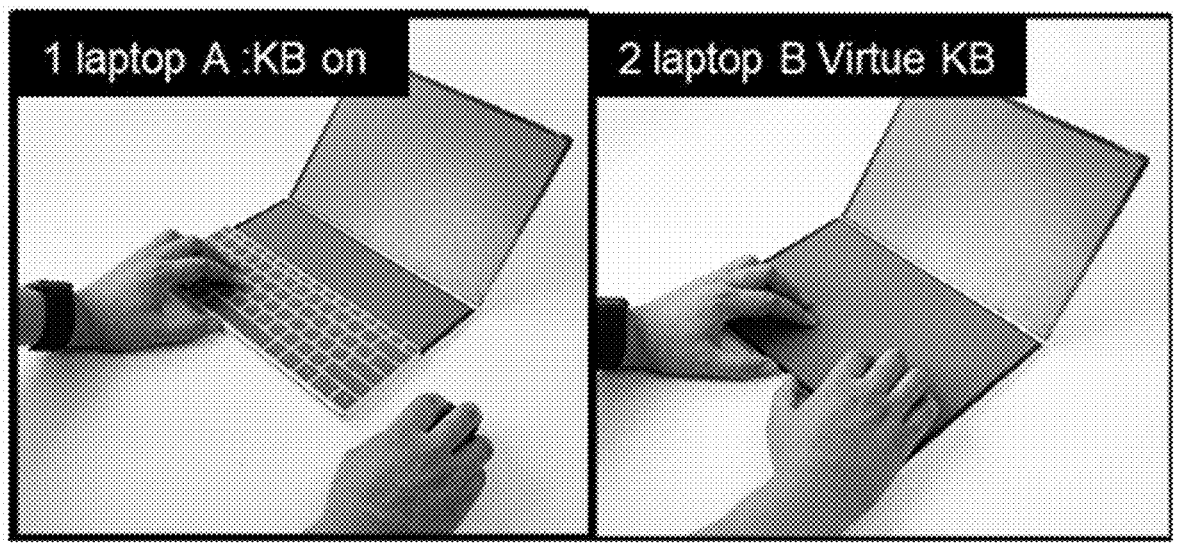
FIG. 4A          FIG. 4B

DISPLAY INTERFACE CONTROL METHOD AND APPARATUS THEREOF, AND STORAGE MEDIUM

CROSS-REFERENCE TO RELATED APPLICATION

This application claims the priority of Chinese Patent Application No. 202211231785.4, filed on Sep. 30, 2022, the content of which is incorporated herein by reference in its entirety.

TECHNICAL FIELD

The present disclosure generally relates to the field of data processing technology, and, more particularly, relates to a display interface control method and an apparatus thereof, and a storage medium.

BACKGROUND

As users have higher requirements for the comfort of electronic equipment, display methods such as large-screen display, extended-screen display, and dual-screen display have been deeply studied and widely used. Current operation systems of electronic devices may not support window movement, window management, performing movement and shortcut operations through touch, and the like, in the dual-screen display mode, which may seriously affect user experience.

SUMMARY

One aspect of the present disclosure provides a display interface control method. The method includes determining a display parameter of a first window in a second display screen based on a first operation of the first window in a first display screen; and displaying the first window in the second display screen based on the display parameter of the first window in the second display screen.

Another aspect of the present disclosure provides a display interface control apparatus. The apparatus includes a memory, storing a program for a display interface control method; and a processor coupled with the memory and configured, when the program being executed, to determine a display parameter of a first window in a second display screen based on a first operation of the first window in a first display screen; and display the first window in the second display screen based on the display parameter of the first window in the second display screen.

Another aspect of the present disclosure provides a non-transitory computer-readable storage medium, containing a computer program for, when executed by a processor, performing a display interface control method. The method includes determining a display parameter of a first window in a second display screen based on a first operation of the first window in a first display screen; and displaying the first window in the second display screen based on the display parameter of the first window in the second display screen.

Other aspects of the present disclosure may be understood by those skilled in the art in light of the description, the claims, and the drawings of the present disclosure.

BRIEF DESCRIPTION OF THE DRAWINGS

Above-mentioned and other objectives, features and advantages of exemplary embodiments of the present disclosure are readily understood by reading following detailed description with reference to the accompanying drawings. In accompanying drawings, a plurality of embodiments of the present disclosure are exemplarily illustrated, which may not limit the present disclosure. In the drawings, same or corresponding reference numerals denote same or corresponding parts.

FIG. 3 illustrates a schematic of using a display screen non-adjacent to the first display screen as a second display screen according to various embodiments of the present disclosure.

FIGS. 4A-4L illustrate schematics of various display modes of display screens capable of being supported by a display interface control method according to various embodiments of the present disclosure.

DETAILED DESCRIPTION

The principle and spirit of the present disclosure are described below with reference to some exemplary embodiments. It should be understood that these embodiments are provided only to make those skilled in the art to better understand and implement the present disclosure, rather than to limit the scope of the present disclosure in any way. To the contrary, providing these embodiments is to make the present disclosure more thorough and complete, and the scope of the present disclosure to be completely understood by those skilled in the art.

Technical solutions of the present disclosure are further described in detail below in conjunction with accompanying drawings and specific embodiments.

Figure 1:
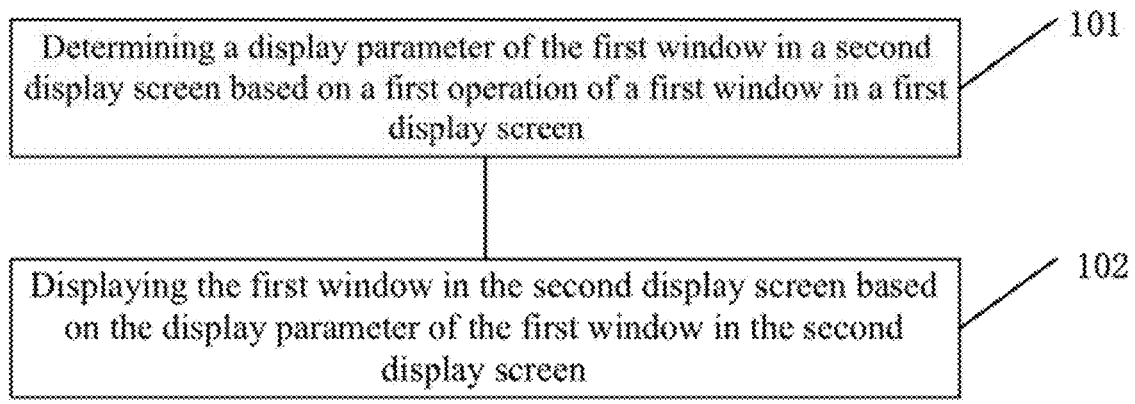
FIG. 1 illustrates an implementation flowchart of a display interface control method according to various embodiments of the present disclosure.

FIG. 1 illustrates an implementation flowchart of a display interface control method according to various embodiments of the present disclosure.

Referring to FIG. 1, the display interface control method in embodiments of the disclosure may at least include the following operation process. In an operation 101, based on the first operation of the first window in the first display screen, a display parameter of the first window in the second display screen may be determined. In an operation 102, the first window may be displayed in the second display screen based on the display parameter.

In the operation 101, based on the first operation of the first window in the first display screen, the display parameter of the first window in the second display screen may be determined.

It should be noted first that the first display screen and the second display screen may be two split screens presented after a same electronic device is split; may also be that one display screen is the display screen of the electronic device itself, and the other display screen is an external device of the electronic device; and may also be that both the first display screen and the second display screen are electronic devices. Meanwhile, the electronic device may only include the first display screen and the second display screen, or the electronic device may be connected with other display screens in addition to the first display screen and the second display screen.

In one embodiment of the present disclosure, the following operations may be configured to implement determining the display parameter of the first window in the second display screen based on the first operation of the first window in the first display screen; displaying the display layout of the second display screen based on the first operation of the first window in the first display screen; furthermore, determining the display parameter of the first window in the second display screen based on the display layout of the second display screen, movement the first window to the second display screen and displaying the first window according to the display parameter. The display layout may be configured to indicate the display parameter of the window in the second display screen.

For example, the first operation of the first window in the first display screen may be hovering a mouse to a first set position of the first window for a first set time period or may also be long-pressing a second set position to hold a second set time period. The first set position and the second set position may be same or different. For example, the first set position may be a "maximization/minimization" button of the first window and may also be any position on the border of the first window. Similarly, the second set position may be a "maximize/minimize" button of the first window and may also be a toolbar frame of the first window.

It should be noted that the first set position and the second set position may also be other positions, which may be set according to actual need. Herein, the first operation may also be movement the mouse to a third set position of the first window to perform a movement operation; and the third set position may be same as or different from the first position. In addition, the first operation may also be a cast operation for the first window.

For example, there may be a difference in screen size or window layout between the first display screen and the second display screen. For example, the first display screen and the second display screen may have different display sizes, such as a same width and different heights. In response to that the height of the first display screen is relatively large and the height of the second display screen is relatively small, the first window may be reduced to fit the height and width of the second display screen for display. In addition, it may also need to determine the display position of the first window in the second display screen according to the window layout of the second display screen. For example, the first window may be displayed at the upper left position of the second display screen and the like.

Determining the display parameter of the first window in the second display screen based on the display layout of the second display screen may further include displaying a small window including at least one display layout; after selecting the display layout, determining the display parameter of the first window based on the display layout; determining the display parameters of other windows in the second display screen; and displaying the display parameters of the first window and other windows of the second display screen according to the display layout.

In one embodiment of the present disclosure, based on the first operation of the first window in the first display screen, determining the display parameter of the first window in the second display screen may be implemented by the following operations. The operation attribute of the first operation may be obtained. In response to that the operation attribute satisfies a preset condition, the second display screen may be determined based on the operation attribute of the first operation. The display parameter of the first window in the second display screen may be further determined based on the attribute of the second display screen, and the first window may be moved to the second display screen and displayed according to the display parameter.

For example, in response to that the resolutions of the first display screen and the second display screen are different, it may need to display the first window in the second display screen after adjusting the display data of the first window according to the resolution of the second display screen.

In one embodiment of the present disclosure, the operation attribute of the first operation may refer to at least one of movement distance and movement direction. The operation attribute of the first operation may also refer to movement speed. The operation attribute of the first operation may refer to movement distance, movement direction, and movement speed. Obviously, the operation attribute of the first operation may refer to movement distance and movement speed; or the operation attribute of the first operation may refer to movement direction and movement speed, which may be set according to need in an actual application process and may not be limited in the present disclosure.

The movement speed may be a vector speed capable of showing the movement direction.

In one embodiment of the present disclosure, the operation attribute satisfying the preset condition may indicate that at least one of the movement distance or the movement direction satisfies the first preset condition. In response to that the movement distance and/or movement direction satisfy the first preset condition, the display screen adjacent to the first display screen may be configured as the second display screen; and in response to that the movement distance and/or the movement direction satisfy the second preset condition, the display screen non-adjacent to the first display screen may be configured as the second display screen.

Figure 2:
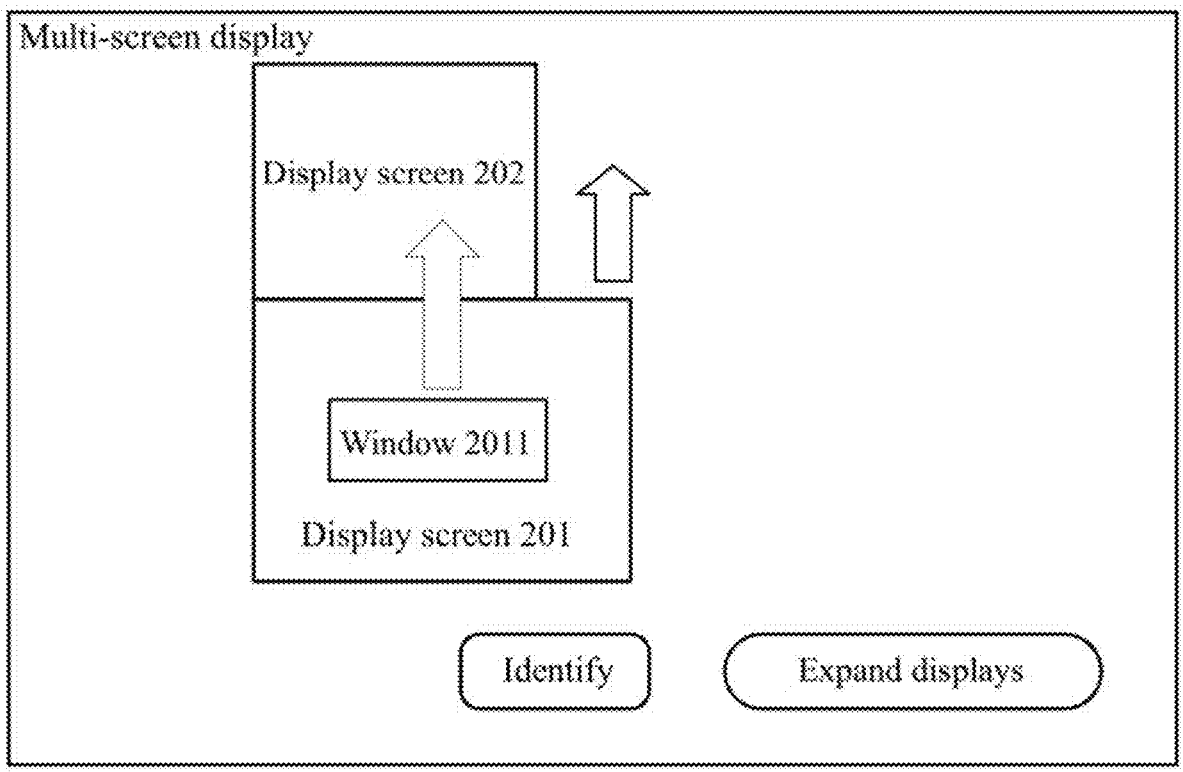
FIG. 2 illustrates a schematic of using a display screen adjacent to a first display screen as a second display screen according to various embodiments of the present disclosure.
Figure 4C:
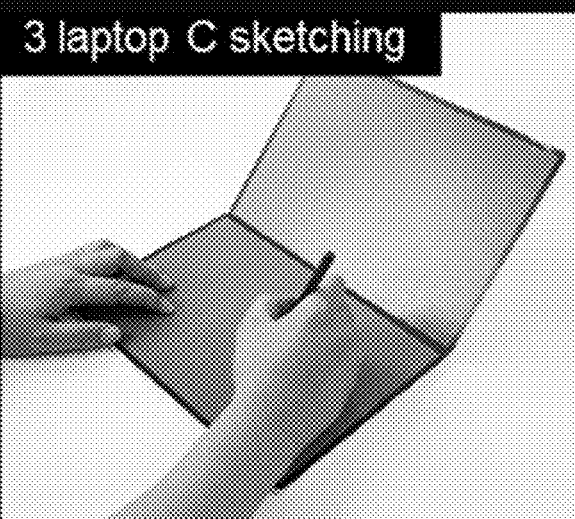
Figure 4D:
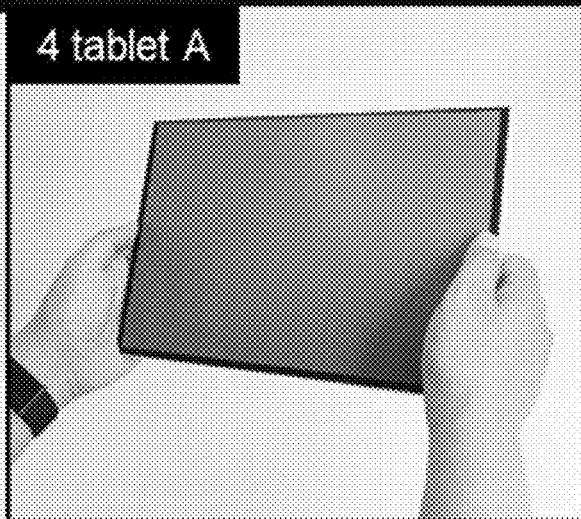
Figure 4E:
Figure 4F:
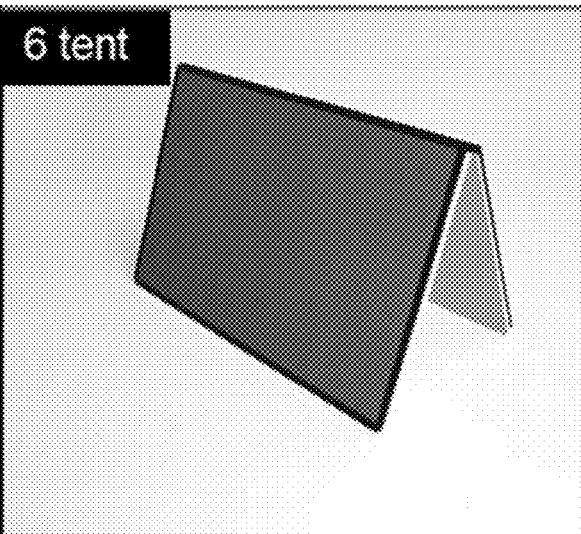
Figure 4G:
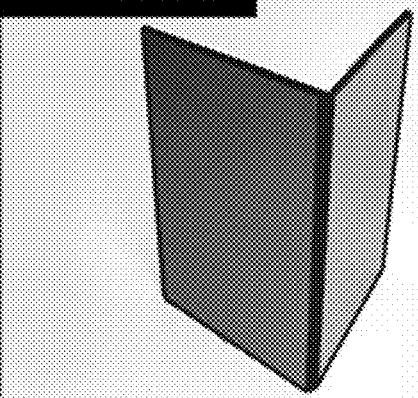
Figure 4H:
Figure 4I:
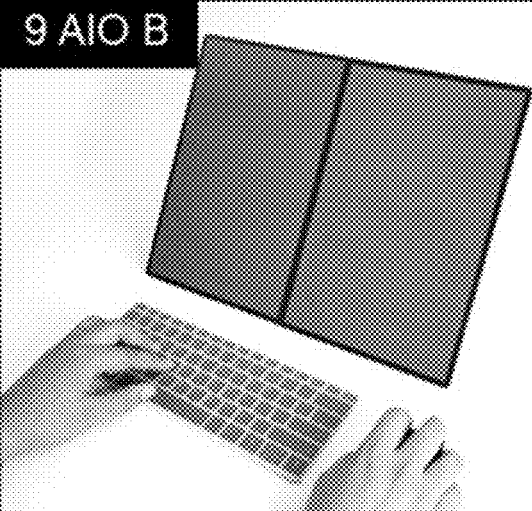
Figure 4J:
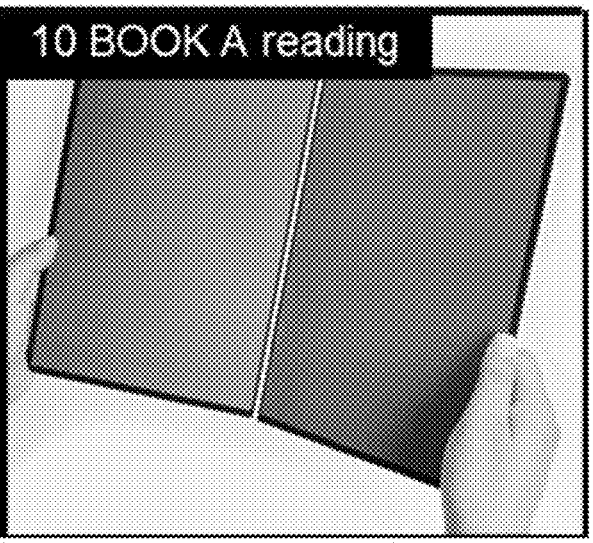
Figures 4K, 4L:
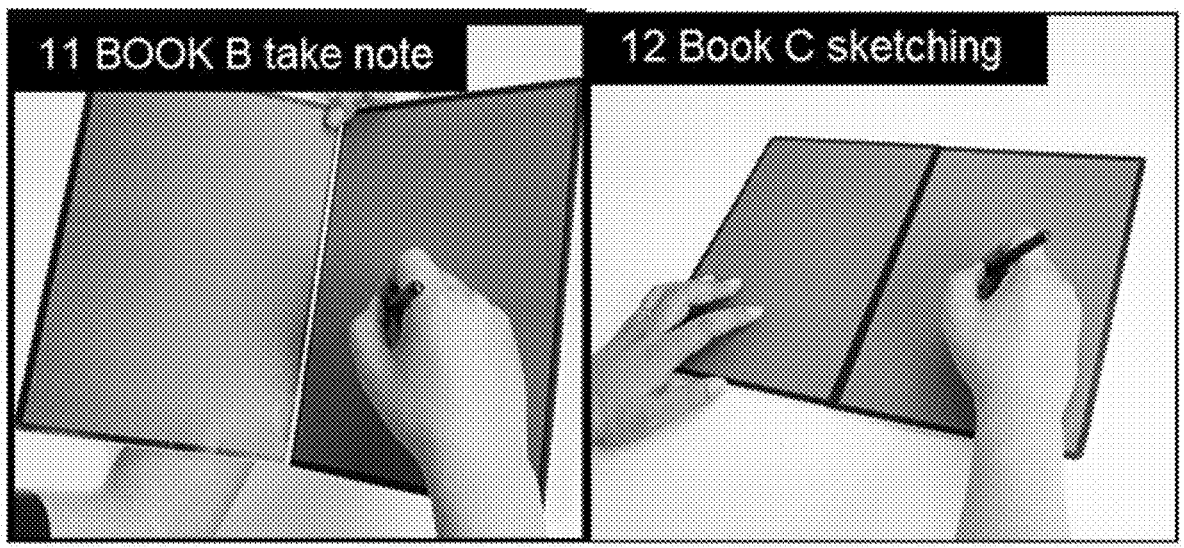

FIG. 2 illustrates a schematic of using a display screen adjacent to the first display screen as the second display screen according to various embodiments of the present disclosure.

Referring to FIG. 2, an electronic device may include at least two display screens which are a display screen 201 and a display screen 202; and two display screens 201 and 202 may be adjacent to each other. The first display screen may be the display screen 201. In response to that the user's finger or mouse moves a window 2011, the movement distance and movement direction may be calculated based on the start coordinates and stop coordinates within the last 100 milliseconds. Herein, whether the window 2011 is casted to the display screen 202 may be determined according to the movement distance and movement direction. For example, it may set that the cast operation may not be performed when the movement distance is less than a set distance. The set distance may be set to 20 pixels and the like. When the movement distance is greater than 20 pixels, the display screen 202 adjacent to the display screen 201 may be configured as the second display screen.

In one embodiment of the present disclosure, the display screens may include at least three display screens. Correspondingly, in response to that the operation attribute satisfies the preset condition, the relative positional relationship between multiple display screens may be further determined, and the second display screen may be determined based on the operation attribute and the relative positional relationship between multiple display screens.

FIG. 3 illustrates a schematic of using a display screen non-adjacent to the first display screen as the second display screen according to various embodiments of the present disclosure.

Referring to FIG. 3, three or more display screens including a display screen 301, a display screen 302 and a display screen 303 may be connected to the electronic device; the first display screen, the second display screen and the third display screen may be arranged along a straight line; a display window 3011 may be located at the display screen 301; and the display screen 301 may be non-adjacent to the display screen 303. The display screen 303 which is non-adjacent to the display screen 301 may be exemplarily configured as the second display screen. For example, the multi-screen display interface in FIG. 3 may be displayed on each display screen, indicating the positional relationship between three display screens (the display screens are planes, so that the positional relationship between the display screens may represent the left-right, up-down relationship and the like, but the display screens may not need to be on a straight line in actual placement).

For example, the first display screen may be the display screen 301. In response to that the user's finger or mouse moves the window 3011, the movement distance and movement direction may be calculated based on the start coordinates and stop coordinates within the last 100 milliseconds. Herein, whether the window 3011 is casted to the display screen 303 may be determined according to the movement distance and movement direction. For example, it may set that the cast operation may not be performed when the movement distance is less than a set distance. The set distance may be set to 40 pixels and the like. When the movement distance is greater than 40 pixels, the display screen 303 non-adjacent to the display screen 301 may be configured as the second display screen.

Furthermore, the movement direction herein may be determined by the directions of lines such as straight lines, parabolas and the like. For example, whether the user uses the finger to touch and slide or uses the mouse to slide and the like, the movement operation of the window 3011 may be unlikely to form a standard straight line. Herein, after drawing the trajectory formed by the movement operation, in response to that the drawn movement trajectory is approximated as a straight line and the movement track moves from the window set position of the window 3011 to the set position of the display screen 303, it may determine that the user has moved the window 3011 to the display screen 303. Or when the movement trajectory formed by the user using the finger to touch and slide or using the mouse to slide is a parabola from the window 3011 to the display screen 303, it may determine that the user moves the window 3011 to the display screen 303.

It should be noted that the adjacency herein and below may refer to sorting of different screens according to a set rule, which may have relative positional relationships such as adjacency, up-down, left-right and the like in space, and may ignore positional relationships in space and only consider communication relationship between communication electronic devices and the display screens.

In the operation 102, the first window may be displayed in the second display screen based on the display parameter.

Herein, the display parameter of the first window in the second display screen may also include theme color, frosted glass effect and the like set by the user. For example, it may configure that when the first window is displayed in the second display screen, the theme color and the frosted glass effect of the second display screen may be used. Therefore, after the second display screen is determined, the theme color and frosted glass effect of the second display screen may be obtained, and the first window may be displayed according to the theme color and frosted glass effect of the second display screen.

In response to configuring that the theme color and frosted glass effect of the first window in the first display screen is maintained to be used when the first window is displayed in the first display screen of the second display, the theme color and frosted glass effect of the first display screen may be obtained after the second display screen is determined, and the obtained theme color and frosted glass effect may be used as the theme color and frosted glass effect of the second display screen to display the first window.

FIGS. 4A-4L illustrate schematics of various display modes of display screens capable of being supported by a display interface control method according to various embodiments of the present disclosure.

FIGS. 4A-4L illustrate 12 types of display modes of display screens capable of being supported by the display interface control method of the embodiment of the present disclosure. During actual application process, the display modes of the display screens supported by the display interface control method in embodiments of the present disclosure may include, but may not be limited to, the display screen display modes shown in FIGS. 4A-4L. It should be noted that KB in FIGS. 4A-4B indicates keyboard, and AIO in FIGS. 4H-4I indicates all-in-one.

Figure 5:
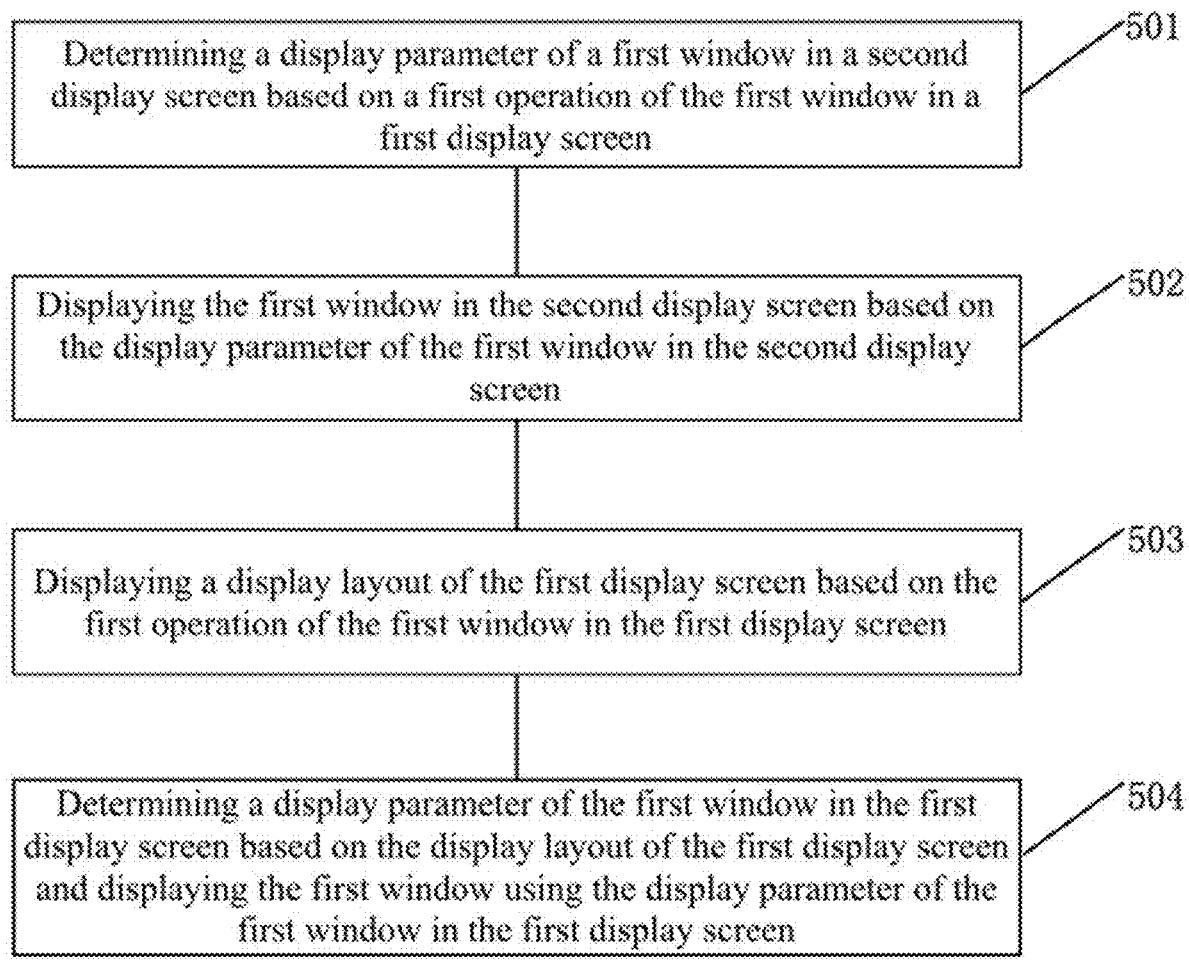
FIG. 5 illustrates another implementation flowchart of a display interface control method according to various embodiments of the present disclosure.

FIG. 5 illustrates another implementation flowchart of a display interface control method according to various embodiments of the present disclosure.

Referring to FIG. 5, embodiments of the present disclosure provide an interface control method, which may at least include following operation process.

In an operation 501, based on the first operation of the first window in the first display screen, the display parameter of the first window in the second display screen may be determined.

In an operation 502, the first window may be displayed in the second display screen based on the display parameter.

In an operation 503, based on the first operation of the first window in the first display screen, the display layout of the first display screen may be displayed.

In one embodiment of the present disclosure, displaying the display layout of the first display screen based on the first operation of the first window in the first display screen may include obtaining the relative positional relationship between the first display screen and the second display screen based on the first operation of the first window in the first display screen, and displaying a movement indication icon matching the relative positional relationship; and displaying the display layout of the first display screen and/or the second display screen based on the second operation of the movement indication icon.

Figure 6:
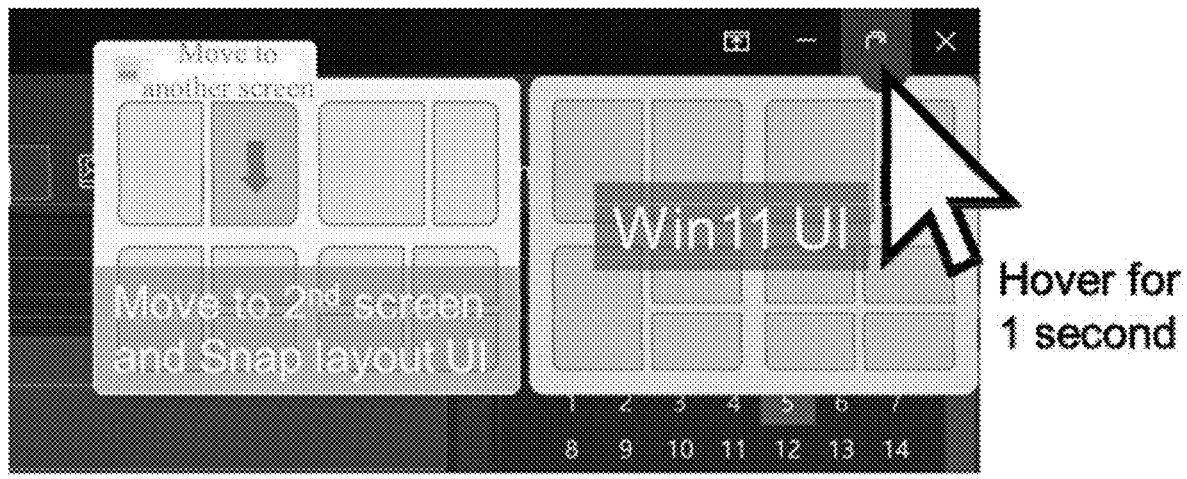
FIG. 6 illustrates a schematic of a first operation configured as a cursor hover operation.

Exemplarily, FIG. 6 illustrates a schematic of the first operation configured as a cursor hover operation.

Referring to FIG. 6, the first display screen and the second display screen may be in a left-right relationship. In response to that the user moves the cursor to the "maximize/minimize" button of the first window and hovers for a set time period through a mouse movement manner, the screen layout of the first display screen and the second display screen as shown in FIG. 6 may be popped up. At this point, the user may move the first window to a specified position in the second display screen 10 according to the screen layout of the first display screen and the second display screen. At least one display layout may be displayed; the display layout may indicate the display parameter of an application window in a corresponding screen, such as the display position; and the size of the display position may be smaller than the size of a corresponding display screen.

Obviously, the display parameter may be not limited to the display position, and may also be a display style, a display shape, a display color, or a display special effect. The set time period of hovering may be set to 1 second, 1.5 seconds, 2 seconds or the like.

The screen layout of the first display screen may be the screen layout on the left side of the figure shown in FIG. 6. The screen layout of the second display screen may be the screen layout on the right side in the figure shown in FIG. 6.

Figure 7:
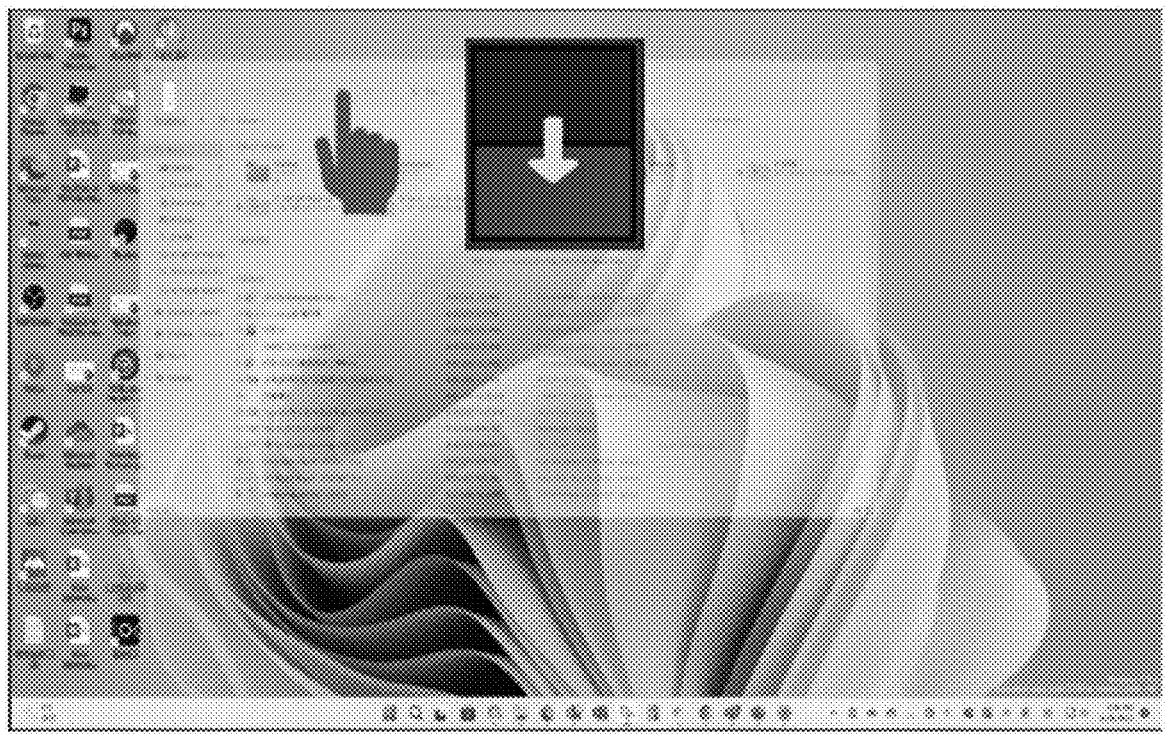
FIG. 7 illustrates a schematic of a first operation configured as a touch hover operation.

FIG. 7 illustrates a schematic of the first operation configured as a touch hover operation.

Referring to FIG. 7, the first display screen and the second display screen may be in an up-down relationship. In response to that the user moves the cursor to the "maximize/minimize" button of the first window and hovers for a set time period through a touch-hover movement manner, the screen layout of the first display screen and the second display screen as shown in FIG. 7 may be popped up. At this point, the user may move the first window to a specified position in the second display screen according to the screen layout of the first display screen and the second display screen.

Figure 8:
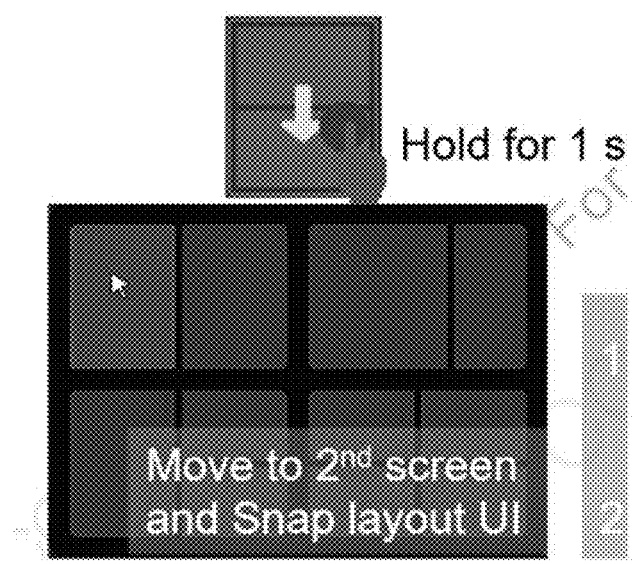
FIG. 8 illustrates an operation schematic that a first operation is a mouse hover operation or touch hover operation, and a first display screen and a second display screen are vertical screens.

FIG. 8 illustrates an operation schematic that a first operation is a mouse hover operation or touch hover operation, and a first display screen and a second display screen are vertical screens.

Referring to FIG. 8, the first display screen and the second display screen may be in a left-right relationship; and both the first display screen and the second display screen may be vertical screens. In response to that the user moves the cursor to the window border of the first window or the "maximize/minimize" button for a set time period through a touch-hover movement manner, the screen layout of the first display screen and the second display screen as shown in FIG. 8 may be popped up. At this point, the user may move the first window to a specified position in the second display screen according to the screen layout of the first display screen and the second display screen.

Herein, the set time period of moving the cursor to the window frame of the first window or the "maximize/minimize" button may be set to be 1 second, 1.5 seconds, 2 seconds or the like.

The screen layout of the first display screen may be the screen layout corresponding to the horizontal direction of "1" shown in FIG. 8; and the screen layout of the second display screen may be the screen layout corresponding to the horizontal direction of "2" shown in FIG. 8. Based on above operations, the first window where the cursor is located in the first display screen may be moved to a specified position in the second display screen.

Figure 9:
FIG. 9 illustrates an icon configured to indicate a front-back movement relationship when a first display screen and a second display screen are in a tent mode.

In response to that the first display screen and the second display screen are at a tent mode and the user moves the cursor to the window border of the first window or the "maximize/minimize" button for a set time period through a touch-hover movement manner, the icon used for movement and indication may be changed to the icon for showing the front-back relationship as shown in FIG. 9.

Figure 10:
FIG. 10 illustrates a display effect schematic of a first display screen and a second display screen applied by an interface display control method according to various embodiments of the present disclosure.

FIG. 10 illustrates a display effect schematic of a first display screen and a second display screen applied by the interface display control method according to various embodiments of the present disclosure. In one embodiment, referring to FIG. 10, the first display screen may be the display screen "B" in FIG. 10, and the second display screen may be the display screen "C" in FIG. 10.

In an operation 504, based on the display layout of the first display screen, the display parameter of the first window in the first display screen may be determined; and the first window may be displayed based on the display parameter.

In one embodiment of the present disclosure, based on the change of the relative positional relationship between the first display screen and the second display screen, corresponding display layout of the first display screen and/or the second display screen may be displayed.

For example, in response to that the first display screen and the second display screen have an association relationship, the association relationship may be configured based on the electronic device. When the display mode of one of the first display screen and the second display screen changes, the display mode of the other display screen may be adjusted accordingly. For example, the display mode may be switched from a horizontal screen mode to a vertical screen mode. The arrangement attribute of the display layout of multiple screens may correspond to the relative positional relationship between the screens. For example, the relative positional relationship between the first display screen and the second display screen is a left-right relationship, the arrangement of the display layout of the displayed first display screen and the second display screen may be also a left-right arrangement. In response to that the relative positional relationship between the first display screen and the second display screen is changed, corresponding arrangement of the display layout may be also changed accordingly.

For example, the electronic device may be a laptop computer. In two display screens connected to the electronic device or two display screens split by the electronic device, a processing option may be displayed at the top of the screen currently being operated. When the electronic device is rotated to the vertical screen mode, the processing option displayed at the narrow end of currently operated display screen may be popped up. Two screens under the vertical screen mode may have become a left-right relationship in reality; and after at the vertical screen mode, the combination of the split screens may be different from the horizontal screens. Therefore, the display interface may switch from the up-down relationship to the left-right relationship.

In the display interface control method and apparatus of embodiments of the present disclosure, based on the first operation of the first window in the first display screen, the display parameter of the first window in the second display screen may be determined; and the first window based on the display screen may be naturally displayed in the second display screen, and multiple display configuration modes may be supported. For dual screens, multiple screens and the like, the screen rotation and window management of the second display screen may be realized, which may significantly improve the user's interactive experience with multiple screens.

Specific implementation process of operations 501 and 502 may be similar to specific implementation process of operations 101 and 102 in one embodiment shown in FIG. 1, which not be described in detail herein.

Similarly, based on above display interface control method, embodiments of the present disclosure also provide a computer-readable storage medium. The computer-readable storage medium may store a program, and when the program is executed by a processor, the processor may at least perform the following steps. In the operation 101, based on the first operation of the first window in the first display screen, the display parameter of the first window in the second display screen may be determined. In the operation 102, the first window may be displayed in the second display screen based on the display parameter.

Figure 11:
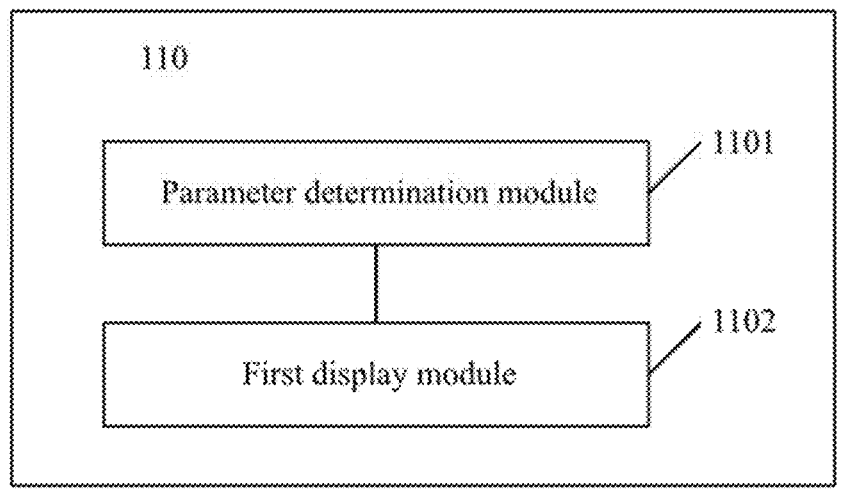
FIG. 11 illustrates a structural schematic of a display interface control apparatus according to various embodiments of the present disclosure.

Furthermore, based on above display interface control method, embodiments of the present disclosure also provide a display interface control apparatus, as shown in FIG. 11. An apparatus 110 may include a parameter determination module 1101, configured to determine the display parameter of the first window in the second display screen based on the first operation of the first window in the first display screen; and a first display module 1102, configured to display the first window in the second display screen based on the display parameter.

In one embodiment of the present disclosure, the parameter determination module 1101 may include a layout display submodule, configured to display the display layout of the second display screen based on the first operation of the first window in the first display screen; a display parameter submodule, configured to determine the display parameter of the first window in the second display screen based on the display layout of the second display screen; and a first movement submodule, configured to move the first window to the second display screen and display the first window according to the display parameter.

In one embodiment of the present disclosure, the parameter determination module 1101 may include an acquisition submodule, configured to obtain the operation attribute of the first operation; a screen determination submodule, configured to determine the second display screen based on the operation attribute of the first operation in response to that the operation attribute satisfies the preset condition; and a second movement sub-module, configured to determine the display parameter of the first window in the second display screen based on the attribute of the second display screen, move the first window to the second display screen, and display the first window according to the display parameter.

In one embodiment of the present disclosure, determining the second display screen based on the attribute of the first operation by the screen determination submodule may include that in response to that the movement distance and/or movement direction satisfy the first preset condition, the display screen adjacent to the first display screen may be configured as the second display screen; and in response to that the movement distance and/or the movement direction satisfy the second preset condition, the display screen non-adjacent to the first display screen may be configured as the second display screen.

In one embodiment of the present disclosure, the operation attribute of the first operation may include at least one of movement distance and/or movement direction; and movement speed.

In one embodiment of the present disclosure, the display screens may include at least three display screens. Correspondingly, the screen determination submodule may determine the second display screen based on the operation attribute of the first operation and may further include determining a relative positional relationship between multiple display screens and determining the second display screen based on the attribute and the relative positional relationship between the plurality of display screens.

In one embodiment of the present disclosure, the apparatus 110 may further include a first layout module, configured to display the display layout of the first display screen based on the first operation of the first window in the first display screen; and the second display module, configured to determine the display parameter of the first window in the first display screen based on the display layout of the first display screen, and display the first window based on the display parameter.

In one embodiment of the present disclosure, the first layout module may include a positional relationship obtaining module, configured to obtain the relative position between the first display screen and the second display screen based on the first operation of the first window in the first display screen and display the movement indication icon matching the relative positional relationship; and the second layout module, configured to display the display layout of the first display screen and/or the second display screen based on the second operation of the movement indication icon.

In one embodiment of the present disclosure, the apparatus 110 may further include a layout change module, configured to display corresponding display layout of the first display screen and/or second display screen based on the change in the relative positional relationship between the first display screen and the second display screen.

Figure 12:
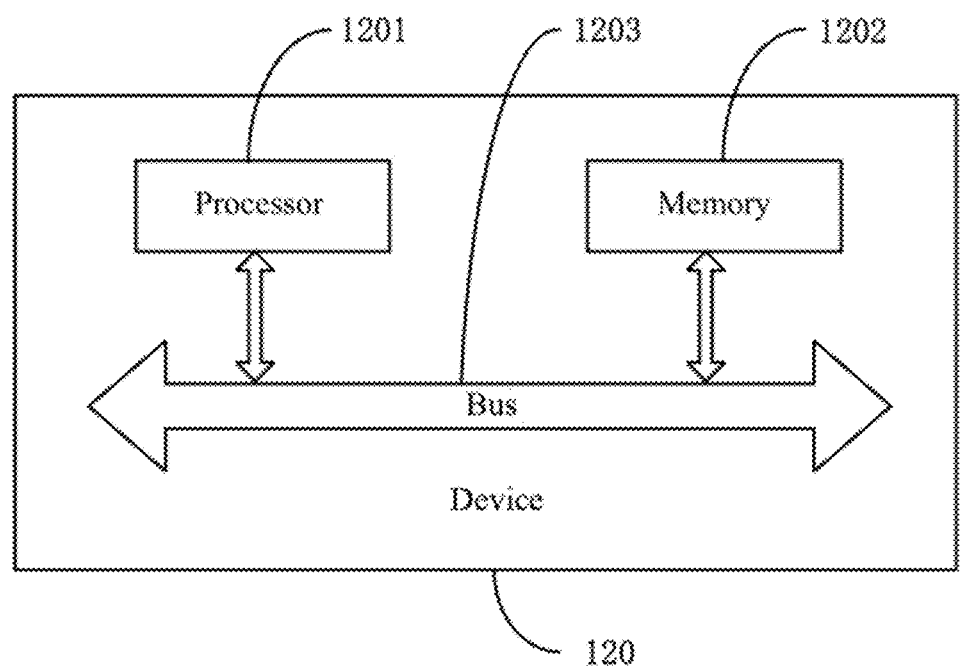
FIG. 12 illustrates a structural schematic of an electronic device according to various embodiments of the present disclosure.

Furthermore, based on above display interface control method, embodiments of the present disclosure also provide an electronic device. As shown in FIG. 12, an electronic device 120 may include at least one processor 1201, and at least one memory 1202 and at least one bus 1203 connected to the processor 1201. The processor 1201 and the memory 1202 may communicate with each other through the bus 1203; the processor 1201 may be configured to call program instructions in the memory 1202 to execute above display interface control method.

It should be noted herein that above description of embodiments of the display interface control apparatus may be similar to the description of embodiments of above display interface control method shown in FIGS. 1-10 and may have beneficial effects similar to those of method embodiments shown in FIGS. 1-10, which may not be described in detail herein. Technical details not disclosed in embodiments of the display interface control apparatus in the present disclosure may refer to the description of method embodiments shown in FIGS. 1-10 in the present disclosure for understanding, which may not be described in detail for brevity.

Compared with the existing technology, the technical solutions provided by the present disclosure may achieve at least the following beneficial effects.

For the display interface control method and apparatus, the display parameter of the first window in the second display screen may be determined based on the first operation of the first window in the first display screen; and the first window in the second display screen may be displayed based on the display parameter of the first window in the second display screen. Therefore, the first window of the first display screen may be displayed on the second display screen by simple operations, and multiple display setting modes may be supported. For dual screens, multiple screens and the like, the screen rotation and window management of the second screen may be implemented, which may significantly improve the user's interactive experience with multiple screens.

It should be noted that, in the present disclosure, the term "comprise", "include" or any other variation thereof may be intended to cover a non-exclusive inclusion, such that a process, a method, an article or an apparatus including a set of elements may include not only those elements, may also include other elements not expressly listed, or elements inherent in the process, the method, the article, or the apparatus. Without more limitation, an element defined by the phrase "comprise a . . . " may not preclude the presence of additional same elements in the process, the method, the article, or the apparatus that includes such element.

In various embodiments provided in the present disclosure, it should be understood that disclosed apparatuses and methods may be implemented in other manners. The apparatus embodiments described above may be only exemplary. For example, the division of units may be only a logical function division. In actual implementation, there may be other division manners. For example, multiple units or components may be combined or integrated to another system, or some features may be ignored or not implemented. In addition, the coupling, direct coupling or communication connection between the components shown or discussed may be through certain interfaces, indirect coupling or communication connection of apparatuses or units which may be electrical, mechanical or other forms.

The units described above as separate components may or may not be physically separated, and the components displayed as units may or may not be physical units. Units may be located in one place or distributed to multiple network units. A part or all of the units may be selected according to actual need to achieve the objective of the solution in various embodiments.

In addition, each functional unit in each embodiment of the present disclosure may be integrated into one processing unit, or each unit may be separately used as one unit, or two or more units may be integrated into one unit. Abovementioned integrated units may be implemented in the form of hardware, or in the form of hardware plus software functional units.

Those skilled in the art may understand that all or a part of steps of above-mentioned method embodiment may be implemented by the relevant hardware of program instruction; above-mentioned program may be stored in a computer-readable storage medium; when the program is executed, the steps in above-mentioned method embodiments may be executed; and above-mentioned storage medium may include a removable storage device, a read only memory (ROM), a magnetic disk, an optical disk, and other various media capable of storing program codes.

Or in response to that above-mentioned integrated units of the present disclosure are implemented in the form of software function modules and sold or used as independent products, the units may also be stored in a computer-readable storage medium. Based on such understanding, the essence of technical solutions of embodiments of the present disclosure or the part that contributes to the existing technology may be embodied in the form of software products. The computer software product may be stored in a storage medium and include multiple instructions to enable a computer device (which may be a personal computer, server, or network device or the like) to execute all or a part of the methods in various embodiments of the present disclosure. In addition, above-mentioned storage media may include various media capable of storing program codes, such as removable storage devices, ROMs, magnetic disks or optical disks.

The above may be merely certain embodiments of the present disclosure, but the protection scope of the present disclosure may not be limited thereto. Within the technical scope disclosed in the present disclosure, those skilled in the art may easily think of changes or substitutions, which should be covered by the protection scope of the present disclosure. Therefore, the protection scope of the present disclosure should be based on the protection scope of the claims.

What is claimed is:

1. A display interface control method, comprising:
   determining a display parameter of a first window in a second display screen based on a first operation applied on a display of the first window in a first display screen, wherein the first operation includes hovering a mouse to a first set position of the first window for a first time period or long-pressing a second set position to hold a second time period; and
   displaying the first window in the second display screen based on the display parameter of the first window in the second display screen.

2. The method according to claim 1, wherein determining the display parameter of the first window in the second display screen based on the first operation applied on the display of the first window in the first display screen includes:
   displaying a display layout of the second display screen based on the first operation applied on the display of the first window in the first display screen, wherein the display layout is configured to indicate the display parameter of the first window in the second display screen;
   determining the display parameter of the first window in the second display screen based on the display layout of the second display screen; and
   moving the first window to the second display screen and displaying the first window according to the display parameter of the first window in the second display screen.

3. The method according to claim 1, wherein determining the display parameter of the first window in the second display screen based on the first operation applied on the display of the first window in the first display screen includes:
   obtaining an operation attribute of the first operation;
   in response to that the operation attribute satisfies a preset condition, determining the second display screen based on the operation attribute of the first operation; and
   determining the display parameter of the first window in the second display screen based on an attribute of the second display screen, moving the first window to the second display screen, and displaying the first window according to the display parameter of the first window in the second display screen.

4. The method according to claim 3, wherein in response to that the operation attribute satisfies the preset condition, determining the second display screen based on the operation attribute of the first operation includes:
  in response to that a movement distance and/or a movement direction satisfies a first preset condition, using a display screen adjacent to the first display screen as the second display screen; and
  in response to that the movement distance and/or the movement direction satisfies a second preset condition, using a display screen non-adjacent to the first display screen as the second display screen.

5. The method according to claim 3, wherein the operation attribute of the first operation includes at least one of:
  a movement distance and/or a movement direction; and
  a movement speed.

6. The method according to claim 3, wherein:
  display screens include at least three display screens; and
  correspondingly, in response to that the operation attribute satisfies the preset condition, determining the second display screen based on the operation attribute of the first operation further includes:
    determining a relative positional relationship between a plurality of display screens and determining the second display screen based on the operation attribute and the relative positional relationship between the plurality of display screens.

7. The method according to claim 1, further including:
  displaying a display layout of the first display screen based on the first operation applied on the display of the first window in the first display screen; and
  determining a display parameter of the first window in the first display screen based on the display layout of the first display screen and displaying the first window using the display parameter of the first window in the first display screen.

8. The method according to claim 7, wherein displaying the display layout of the first display screen based on the first operation applied on the display of the first window in the first display screen includes:
  obtaining a relative positional relationship between the first display screen and the second display screen based on the first operation applied on the display of the first window in the first display screen and displaying a movement indication icon matching the relative positional relationship; and
  displaying the display layout of the first screen and/or the display layout of the second screen based on a second operation of the movement indication icon.

9. The method according to claim 1, further including:
  determining an arrangement attribute of display layouts of the first display screen and the second display screen based on a relative positional relationship between the first display screen and the second display screen, wherein the arrangement attribute corresponds to the relative positional relationship.

10. A display interface control apparatus, comprising:
  a memory, storing a program for a display interface control method; and
  a processor coupled with the memory and configured, when the program being executed, to:
    determine a display parameter of a first window in a second display screen based on a first operation applied on a display of the first window in a first display screen wherein the first operation includes hovering a mouse to a first set position of the first window for a first time period or long-pressing a second set position to hold a second time period; and
    display the first window in the second display screen based on the display parameter of the first window in the second display screen.

11. The apparatus according to claim 10, wherein to determine the display parameter of the first window in the second display screen based on the first operation applied on the display of the first window in the first display screen, the processor is configured to:
  display a display layout of the second display screen based on the first operation applied on the display of the first window in the first display screen, wherein the display layout is configured to indicate the display parameter of the first window in the second display screen;
  determine the display parameter of the first window in the second display screen based on the display layout of the second display screen; and
  move the first window to the second display screen and display the first window according to the display parameter of the first window in the second display screen.

12. The apparatus according to claim 10, wherein to determine the display parameter of the first window in the second display screen based on the first operation applied on the display of the first window in the first display screen, the processor is configured to:
  obtain an operation attribute of the first operation;
  in response to that the operation attribute satisfies a preset condition, determine the second display screen based on the operation attribute of the first operation; and
  determine the display parameter of the first window in the second display screen based on an attribute of the second display screen, move the first window to the second display screen, and display the first window according to the display parameter of the first window in the second display screen.

13. The apparatus according to claim 12, wherein in response to that the operation attribute satisfies the preset condition, to determine the second display screen based on the operation attribute of the first operation, the processor is configured to:
  in response to that a movement distance and/or a movement direction satisfies a first preset condition, use a display screen adjacent to the first display screen as the second display screen; and
  in response to that the movement distance and/or the movement direction satisfies a second preset condition, use a display screen non-adjacent to the first display screen as the second display screen.

14. The apparatus according to claim 12, wherein the operation attribute of the first operation includes at least one of:
  a movement distance and/or a movement direction; and
  a movement speed.

15. The apparatus according to claim 12, wherein:
  display screens include at least three display screens; and
  correspondingly, in response to that the operation attribute satisfies the preset condition, determining the second display screen based on the operation attribute of the first operation further includes:
    determining a relative positional relationship between a plurality of display screens and determining the second display screen based on the operation attribute and the relative positional relationship between the plurality of display screens.

16. The apparatus according to claim 10, wherein the processor is further configured to:

display a display layout of the first display screen based on the first operation applied on the display of the first window in the first display screen; and determine a display parameter of the first window in the first display screen based on the display layout of the first display screen and display the first window using the display parameter of the first window in the first display screen.

17. The apparatus according to claim 16, wherein to display the display layout of the first display screen based on the first operation applied on the display of the first window in the first display screen, the processor is configured to:

obtain a relative positional relationship between the first display screen and the second display screen based on the first operation of the first window in the first display screen and display a movement indication icon matching the relative positional relationship; and display the display layout of the first screen and/or the display layout of the second screen based on a second operation of the movement indication icon.

18. The apparatus according to claim 10, wherein the processor is further configured to:

determine an arrangement attribute of display layouts of the first display screen and the second display screen based on a relative positional relationship between the first display screen and the second display screen, wherein the arrangement attribute corresponds to the relative positional relationship.

19. A non-transitory computer-readable storage medium, containing a computer program for, when executed by a processor, performing a display interface control method, the method comprising:

applying a first operation to a first window on a first display screen including hovering a mouse to a first set position of the first window for a first time period, long-pressing a second set position of the first window to hold a second time period, and movingthe mouse to a third set position of the first window to perform a movement operation;

displaying a display layout of a second display screen based on the first operation applied on the first window on the first display screen, wherein the display layout indicating a relative positional relationship between the first display screen and the second display screen, and display positions and sizes of the first display screen and the second display screen;

determining a display parameter of the first window on the second display screen based on the first operation applied on the first window on the first display screen and the display layout of the second display screen; and displaying the first window on the second display screen based on the display parameter of the first window on the second display screen.

20. The storage medium according to claim 19, wherein to determine the display parameter of the first window on the second display screen based on the first operation applied on the first window on the first display screen, the processor is configured to:

move the first window to the second display screen and display the first window according to the display parameter of the first window in the second display screen, the display parameter further indicating a theme color or a display effect of the second display screen.

* * * * *